Figure 1:
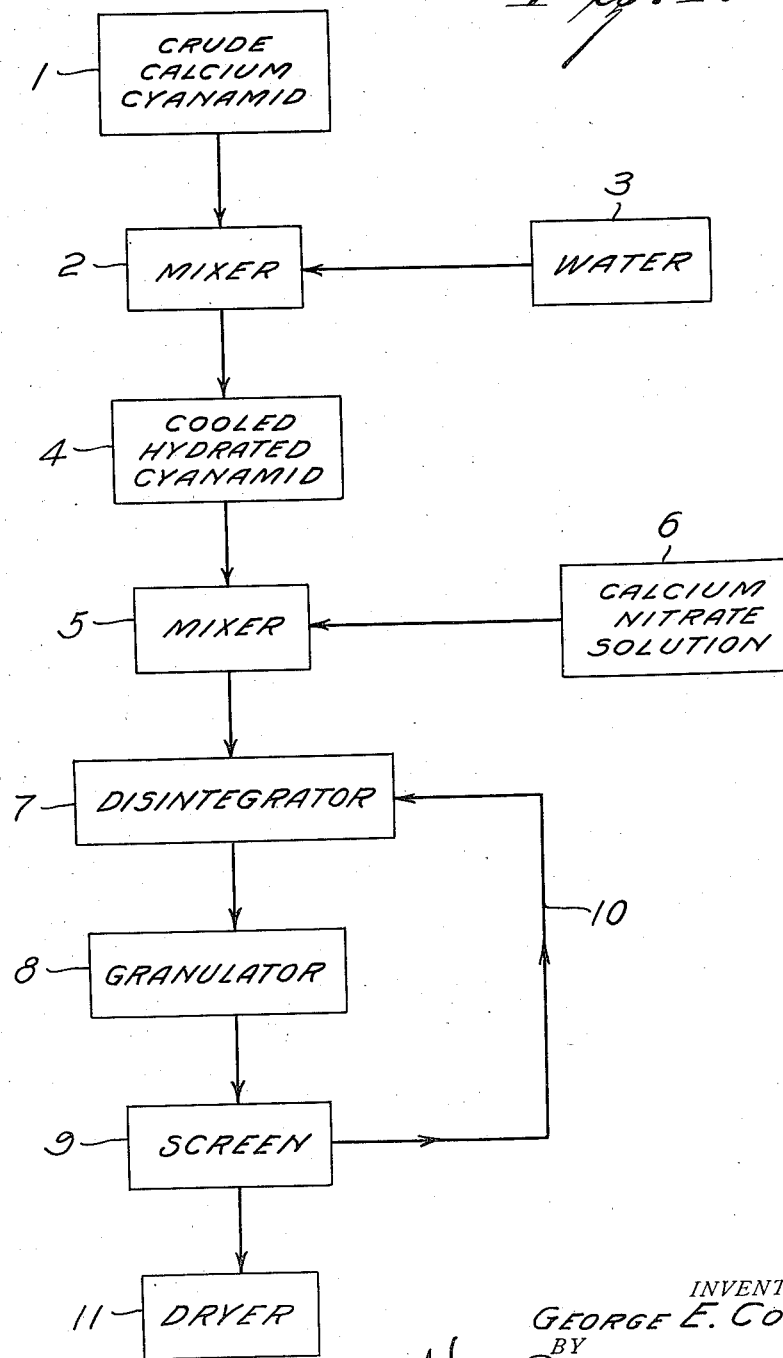

Feb. 5, 1935.  G. E. COX  1,989,684
GRANULATED CALCIUM NITRATE AND METHOD OF PRODUCING THE SAME
Filed April 27, 1932  2 Sheets-Sheet 1

INVENTOR.
GEORGE E. COX,
BY
ATTORNEY

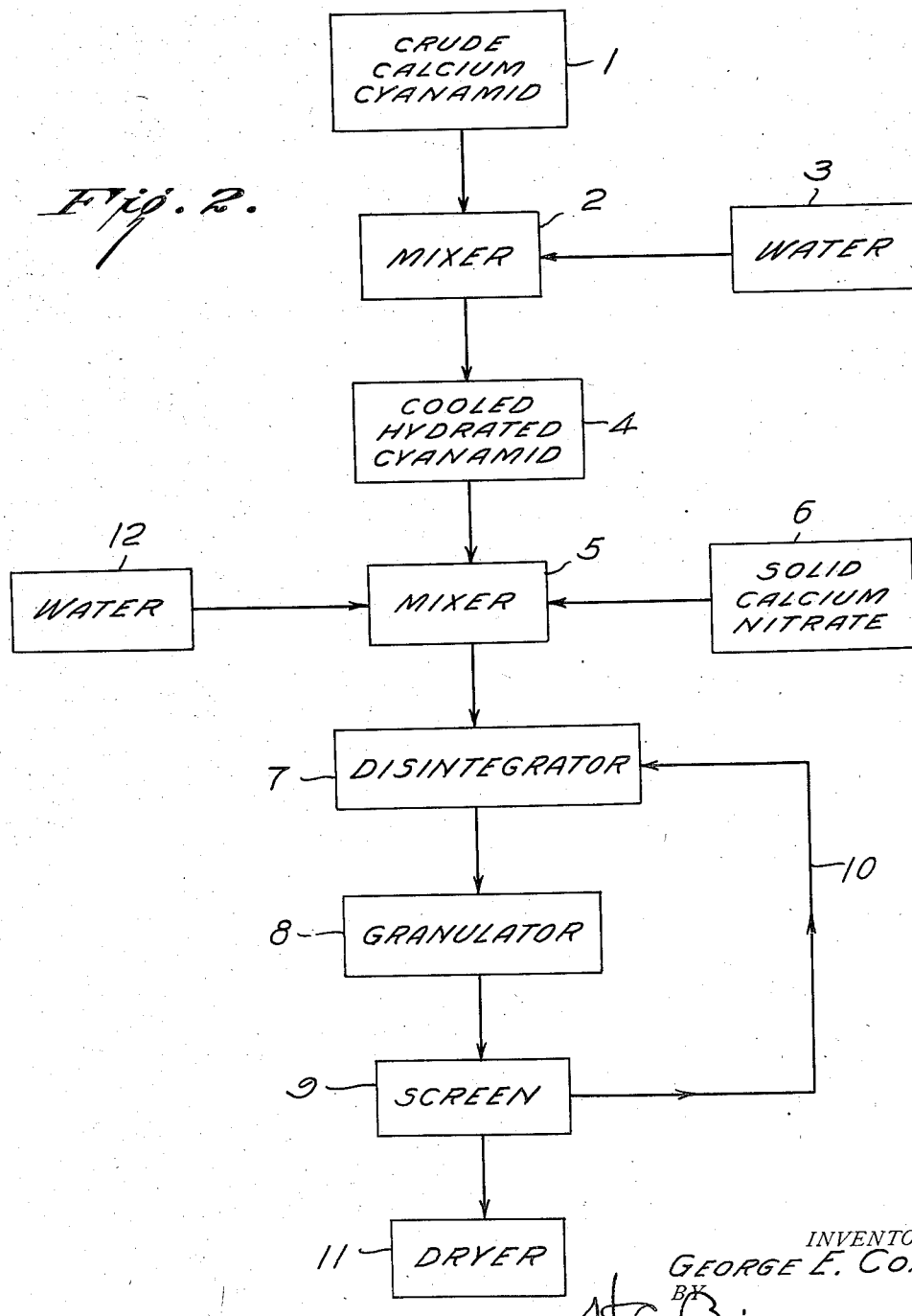

Patented Feb. 5, 1935

1,989,684

UNITED STATES PATENT OFFICE 1,989,684

GRANULATED CALCIUM NITRATE AND METHOD OF PRODUCING THE SAME

George E. Cox, Niagara Falls, N. Y., assignor to American Cyanamid Company, New York, N. Y., a corporation of Maine Application April 27, 1932, Serial No. 607,792

22 Claims. (Cl. 71—9)

This invention relates to the granulation of calcium nitrate to render its properties such that it may be used successfully as a fertilizer and particularly this invention is adapted to render calcium nitrate readily used in fertilizer distributing apparatus.

Calcium nitrate as a chemical product has been known for a considerable time and has been used as a fertilizer material. However, the compound is very hygroscopic and it quickly takes up moisture from the air rendering the same sticky. It often takes up so much water that it dissolves in the water thus absorbed. These properties render it almost impossible to use the calcium nitrate in fertilizer distributing machines because of the difficulty of causing the material to run through the machine and be uniformly distributed over the ground. Attempts have been made in the past to limit this difficulty and among the methods previously proposed was one in which the calcium nitrate was heated to drive off water and to melt the same, after which it was subjected to a granulating process which consisted in simultaneously breaking up the molten material into small particles and cooling the same to form granules. These granules could be readily handled in the ordinary distributing machine when freshly made, but in an extremely short time the material took up water from the air forming large masses of wet material which could not be successfully distributed.

The present invention is intended to overcome the disadvantages of calcium nitrate as previously known and of the methods for granulating the same which had heretofore been attempted, it being among the objects of this invention to provide a granulated product which can be easily distributed uniformly over the ground to be fertilized and which does not absorb moisture from the air in such amounts as to cause agglomeration and caking thereof.

In practicing my invention I granulate calcium nitrate by means of a suitable binder preferably calcium cyanamid. I find that in using calcium cyanamid as a binder or granulating material for calcium nitrate, granules may be made which are permanent, that is, do not disintegrate on aging or standing, and do not absorb water in such amounts under ordinary conditions as to cause caking of the product. In accordance with my process a minimum amount of water is present at all stages thereof and in the drying stage the water is evaporated as quickly as possible so that the final product is very low in free moisture content. In all cases the final product contains less than 5% of free water, that is, water which can be driven off by evaporation at temperatures usually from 100° C. to 115° C. Preferably the final product contains not over 1% of such free water. By reason of the process which I prefer to follow I avoid the transformation of cyanamid to undesirable forms of nitrogen such as dicyandiamid, cyanurea and similar compounds.

The method which I follow consists generally of the following steps:

(1) Calcium cyanamid is completely hydrated to decompose the carbide and hydrate the lime present. The minimum amount of water for these functions is used.

(2) The hydrated cyanamid is then allowed to cool, preferably to atmospheric temperatures.

(3) A concentrated solution of calcium nitrate is made, the solution being preferably at or near the saturation point.

(4) The hydrated cyanamid is mixed with the calcium nitrate solution and the temperature of the mixture is held as closely as possible to atmospheric temperatures or lower.

(5) The amount of cyanamid used may vary within wide limits but is ordinarily from 20% to 50% of the calcium nitrate.

(6) The mixture is disintegrated to give proper size particles.

(7) The disintegrated material is granulated by tumbling in a suitable apparatus at approximately atmospheric temperatures.

(8) The screen granules are quickly dried to reduce the free water content thereof to below 5% and preferably to below 1%.

In the accompanying drawings constituting a part hereof and in which like reference characters indicate like parts Figure 1 is a flow sheet showing the various steps of my process, and Figure 2 is a similar flow sheet of a modification thereof.

Crude calcium cyanamid 1 is placed in a mixing device 2 and a sufficient amount of water 3 is added thereto to completely hydrate the same and the mixture is tumbled until hydration is complete, that is, the carbide is decomposed and the free lime is completely hydrated. The material is then cooled as shown at 4, after which it is transferred to a mixer 5 and a solution 6 of calcium nitrate, in an approximately 50% solution, is mixed therewith.

The moist material from the mixer 5 is then passed through a disintegrator 7 which breaks up any lumps formed and then through granulator 8. It is there tumbled at approximately atmospheric temperatures until it is agglomerated into particles of the desired size. The granulated product is then passed over a screen 9 to remove the oversize lumps which are returned to the disintegrator 7 as shown at 10. The granules are then passed through a rotary drier 11 where they are subjected to the action of hot gases, the temperature of the gases and granules being such that practically all of the free water is removed from the granules in a very short time. It is impossible, with accuracy, to state the length of time necessary for this operation as it varies with numerous factors, but I find in a large installation that the drying can be accomplished in a period up to 3 hours and preferably up to 1 hour with perfectly satisfactory results.

The product thus obtained is substantially uniform in granular size and contains substantially no dust. It is perfectly stable both physically and chemically and I find I can store such material for considerable periods of time without any deterioration, that is, without formation of substantial amounts of undesirable forms of nitrogen such as dicyandiamid and without any substantial amount of dusting of the granules. The granules have very little tendency to cake upon exposure to atmospheric conditions in storage at the factory, nor in shipment in ordinary paper lined bags.

When the amount of calcium nitrate in the composition is high it is of advantage not to use the calcium nitrate in solution, but in the dry state. In fact, my method as outlined in the chart in Figure 1 may be operated with solid calcium nitrate instead of a solution thereof, regardless of the relative amounts of calcium nitrate and cyanamid present.

The flow sheet of Figure 2 illustrates this phase of my invention. Crude cyanamid 1 is placed in mixer 2 with water 3 and the cooled hydrated cyanamid 4 is passed through mixer 5 where it is intimately mixed with solid calcium nitrate 6. Water 12 is introduced into the mixer 5 in such a manner as to be uniformly incorporated with the solid materials. After mixing is complete the moist material passes through the disintegrator to the agglomerator 8 over screen 9 and to the dryer 11. The large lumps from screen 9 are passed as shown at 10 to the disintegrator.

By this modification better control of the water content of the mixture is possible and it enables the use of much less water than if the calcium nitrate were used in solution. By adding the water to the mixture of calcium nitrate and hydrated cyanamid there will be partial solution of the calcium nitrate which will form the homogeneous mixture necessary for the subsequent granulation step. While I may use various proportions of water I have found that good results are obtained in using about 16% of water based on the weight of calcium nitrate in the mixture when the mixture consists of aproximately 60% calcium nitrate and 40% hydrated cyanamid. In other words, the amount of water added at this stage is about 9% of the total mix. In case larger percentages of calcium nitrate are used the amount of water may be reduced to some extent. The temperature of evaporation of the water may be as low as 70° C. but in actual practice the temperature will be over 100° C. and it may be much higher. I have used a temperature of 150° C. and I may use as high as 300° C. It is essential that the water be driven off but the temperature should not be so high as to cause any material amount of decomposition of the nitrogen compounds present.

Although I have described my invention setting forth a single embodiment thereof, my invention is not limited to the details described above. It will be understood to those skilled in the art that the process is susceptible of considerable variations with good results and my invention is not to be limited except by the scope of the claims appended hereto.

What I claim is:

1. A method of granulating calcium nitrate which comprises hydrating calcium cyanamid, mixing therewith a solution of calcium nitrate in an amount greater than the cyanamid, granulating the mixture and quickly drying the granules to reduce the free water content thereof to below 5%.

2. A method of granulating calcium nitrate which comprises hydrating calcium cyanamid, mixing therewith a solution of calcium nitrate in an amount greater than the cyanamid, granulating the mixture and quickly drying the granules to reduce the free water content thereof to below 1%.

3. A method of granulating calcium nitrate which comprises hydrating calcium cyanamid, cooling the same, mixing therewith a solution of calcium nitrate in an amount greater than the cyanamid, granulating the mixture and quickly drying the granules to reduce the free water content thereof to below 5%.

4. A method of granulating calcium nitrate which comprises hydrating calcium cyanamid, cooling the same, mixing therewith a solution of calcium nitrate in an amount greater than the cyanamid, granulating the mixture and quickly drying the granules to reduce the free water content thereof to below 1%.

5. A method of granulating calcium nitrate which comprises hydrating calcium cyanamid with the minimum amount of water necessary to hydrate the lime present and decompose the carbide, mixing therewith a solution of calcium nitrate in an amount greater than the cyanamid, granulating the mixture, and quickly drying the granules to reduce the free water content thereof to below 5%.

6. A method of granulating calcium nitrate which comprises hydrating calcium cyanamid with the minimum amount of water necessary to hydrate the lime present and decompose the carbide, mixing therewith a solution of calcium nitrate in an amount greater than the cyanamid, granulating the mixture, and quickly drying the granules to reduce the free water content thereof to below 1%.

7. A method of granulating calcium nitrate which comprises hydrating calcium cyanamid, mixing therewith a concentrated solution of calcium nitrate in an amount greater than the cyanamid, granulating the mixture, and quickly drying the granules to reduce the free water content thereof to below 5%.

8. A method of granulating calcium nitrate which comprises hydrating calcium cyanamid, mixing therewith a concentrated solution of calcium nitrate in an amount greater than the cyanamid, granulating the mixture, and quickly drying the granules to reduce the free water content thereof to below 1%.

9. A method of granulating calcium nitrate which comprises hydrating calcium cyanamid, mixing therewith a substantially saturated solution of calcium nitrate in an amount greater than the cyanamid, granulating the mixture, and quickly drying the granules to reduce the free water content thereof to below 5%.

10. A method of granulating calcium nitrate which comprises hydrating calcium cyanamid, mixing therewith a substantially saturated solution of calcium nitrate in an amount greater than the cyanamid, granulating the mixture, and quickly drying the granules to reduce the free water content thereof to below 1%.

11. A method of granulating calcium nitrate which comprises hydrating calcium cyanamid, mixing therewith a solution of calcium nitrate in an amount greater than the cyanamid, granulating the mixture and quickly drying the granules to reduce the free water content thereof to below 5%, the amount of cyanamid being from 20% to 50% of the nitrate.

12. A method of granulating calcium nitrate which comprises hydrating calcium cyanamid, mixing therewith a solution of calcium nitrate in an amount greater than the cyanamid, granulating the mixture and quickly drying the granules to reduce the free water content thereof to below 1%, the amount of cyanamid being from 20% to 50% of the nitrate.

13. A method of granulating calcium nitrate which comprises hydrating calcium cyanamid, mixing calcium nitrate therewith in the presence of water and in an amount greater than the cyanamid, granulating the mixture and quickly drying the granules to reduce the free water content thereof to below 5%.

14. A method of granulating calcium nitrate which comprises hydrating calcium cyanamid, mixing calcium nitrate therewith in the presence of water and in an amount greater than the cyanamid, granulating the mixture and quickly drying the granules to reduce the free water content thereof to below 1%.

15. A method of granulating calcium nitrate which comprises hydrating calcium cyanamid, mixing solid calcium nitrate therewith, adding water thereto, granulating the mixture and quickly drying the granules to reduce the free water content thereof to below 5%.

16. A method of granulating calcium nitrate which comprises hydrating calcium cyanamid, mixing solid calcium nitrate therewith, adding water thereto, granulating the mixture and quickly drying the granules to reduce the free water content thereof to below 1%.

17. A method of granulating calcium nitrate which comprises hydrating calcium cyanamid, mixing solid calcium nitrate therewith in an amount greater than the cyanamid, adding water thereto, granulating the mixture and quickly drying the granules to reduce the free water content thereof to below 5%.

18. A method of granulating calcium nitrate which comprises hydrating calcium cyanamid, mixing solid calcium nitrate therewith in an amount greater than the cyanamid, adding water thereto, granulating the mixture and quickly drying the granules to reduce the free water content thereof to below 1%.

19. Granulated calcium nitrate containing a substantial amount of calcium cyanamid, the free water content thereof being less than 5%, being free from unhydrated lime and being physically stable, the amount of calcium cyanamid being less than the calcium nitrate.

20. Granulated calcium nitrate containing a substantial amount of calcium cyanamid, the free water content thereof being less than 1%, being free from unhydrated lime and being physically stable, the amount of calcium cyanamid being less than the calcium nitrate.

21. Granulated calcium nitrate containing from 20% to 50% of calcium cyanamid, the free water content thereof being less than 5%, being free from unhydrated lime and being physically stable.

22. Granulated calcium nitrate containing from 20% to 50% of calcium cyanamid, the free water content thereof being less than 1%, being free from unhydrated lime and being physically stable.

GEORGE E. COX.